(12) United States Patent
Seon et al.

(10) Patent No.: US 9,777,861 B2
(45) Date of Patent: Oct. 3, 2017

(54) OPERATING STRUCTURE OF EXHAUST HEAT RECOVERY DEVICE WITH EMBEDDED VALVE ACTUATOR

(71) Applicants: Hyundai Motor Company, Seoul (KR); Kia Motors Corporation, Seoul (KR)

(72) Inventors: Jong-Ho Seon, Seoul (KR); Jae-Yeon Kim, Hwasung-shi (KR); Ho-Chan An, Hwasung-shi (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 413 days.

(21) Appl. No.: 14/546,210

(22) Filed: Nov. 18, 2014

(65) Prior Publication Data
US 2015/0219236 A1    Aug. 6, 2015

(30) Foreign Application Priority Data
Feb. 4, 2014 (KR) .......................... 10-2014-12350

(51) Int. Cl.
*G05D 23/00* (2006.01)
*F16K 31/00* (2006.01)
(Continued)

(52) U.S. Cl.
CPC .............. *F16K 31/002* (2013.01); *F01N 5/02* (2013.01); *F16K 1/30* (2013.01); *F01N 2240/02* (2013.01);
(Continued)

(58) Field of Classification Search
CPC . F16K 31/002; F16K 1/30; F01N 5/02; F01N 2240/36; F01N 2240/02; F01P 2060/16; F02G 5/02
(Continued)

(56) References Cited

U.S. PATENT DOCUMENTS

| 2005/0056402 A1* | 3/2005 | Han | ..................... F28D 1/05366 165/103 |
| 2009/0025922 A1* | 1/2009 | Strzelczyk | ........... G05D 23/022 165/297 |

(Continued)

FOREIGN PATENT DOCUMENTS

| JP | 2009-209913 A | 9/2009 |
| KR | 10-2013-0021216 A | 3/2013 |

(Continued)

*Primary Examiner* — Len Tran
*Assistant Examiner* — Claire Rojohn, III
(74) *Attorney, Agent, or Firm* — Morgan, Lewis & Bockius LLP

(57) ABSTRACT

An operating structure of an exhaust heat recovery device may include a bypass valve rotatable about a rotation shaft to open and close a bypass passage; a heat exchanger communicating with the bypass passage, a valve actuator inserted into the heat exchanger, and having a piston moved upward and downward depending on a temperature of coolant; a guide unit in which an end of the piston is slidably inserted, and at which an end of a rod is slidably inserted; a displacement transmission medium accommodated in the guide unit, and moved along with the piston; a link unit rotatably connected to the bypass valve and the rod, and converting sliding motion of the rod into rotation of the bypass valve; and an elastic restoring unit operating the rod so that the rod is inserted into the guide unit, or operating the bypass valve so that the bypass valve is closed.

10 Claims, 7 Drawing Sheets

(51) Int. Cl.
*F16K 1/30* (2006.01)
*F01N 5/02* (2006.01)
*F02G 5/02* (2006.01)

(52) U.S. Cl.
CPC ....... *F01N 2240/36* (2013.01); *F01P 2060/16* (2013.01); *F02G 5/02* (2013.01); *Y02T 10/16* (2013.01); *Y02T 10/166* (2013.01)

(58) Field of Classification Search
USPC .................................................. 165/297, 298
See application file for complete search history.

(56) References Cited

U.S. PATENT DOCUMENTS

| | | | |
|---|---|---|---|
| 2011/0061744 A1* | 3/2011 | Zillig | F15B 21/042 137/15.01 |
| 2015/0219236 A1* | 8/2015 | Seon | F16K 1/30 165/297 |
| 2015/0241884 A1* | 8/2015 | Carns | F16K 31/535 236/101 A |
| 2016/0305347 A1* | 10/2016 | Penzkofer | F01N 1/165 |
| 2016/0363399 A1* | 12/2016 | Kim | F16K 31/002 |

FOREIGN PATENT DOCUMENTS

| | | |
|---|---|---|
| KR | 10-2013-0041243 A | 4/2013 |
| WO | WO 2013/091108 A1 | 6/2013 |

\* cited by examiner

OPERATING STRUCTURE OF EXHAUST HEAT RECOVERY DEVICE WITH EMBEDDED VALVE ACTUATOR

CROSS-REFERENCE TO RELATED APPLICATIONS

The present application claims priority to Korean Patent Application No. 10-2014-12350, filed on Feb. 4, 2014, the entire contents of which is incorporated herein for all purposes by this reference.

BACKGROUND OF THE INVENTION

Field of the Invention

The present invention relates to an operating structure of an exhaust heat recovery device with an embedded valve actuator, in which the valve actuator is inserted into the exhaust heat recovery device, and more particularly, to an operating structure of an exhaust heat recovery device with an embedded valve actuator, which has a rod which is moved through a displacement transmission medium, or moved independently, a link unit which converts sliding motion of the rod into rotational motion of a rotation shaft of a bypass valve, and an elastic restoring unit which applies elastic restoring force to the rod or the rotation shaft of the bypass valve, thereby reducing an overall size of the exhaust heat recovery device.

Description of Related Art

In general, in a vehicle, depending on a traveling state of the vehicle, warming up and heating steps for an engine are performed when the vehicle initially starts, a thermoelectric power generating step is performed when the vehicle travels, and a bypassing step is performed when the vehicle travels on a slope or travels at an excessive speed.

An exhaust heat recovery device for a vehicle refers to a device that recovers exhaust heat, which is discarded after combustion in an engine, and uses exhaust heat to warm up the engine and a transmission, or transfers recovered thermal energy to an air conditioning device so as to heat the interior of the vehicle.

In a case in which the exhaust heat recovery device for a vehicle is used, a coolant may be heated using high-temperature exhaust gas at the time of initially starting the engine, and as a result, effects of improving fuel efficiency and reducing exhaust gas may be obtained by shortening the time required to preheat the engine.

The largest amount of pollutants, which are discharged from the vehicle, is discharged in an engine idle state before the engine warms up, but by shortening warming-up time using the exhaust heat recovery device, an amount of pollutants, which are discharged from the vehicle, may be reduced.

Since the coolant heated by the exhaust heat recovery device quickly raises temperatures of an engine coolant and transmission oil, friction in the engine and the transmission may be reduced, and an effect of heating the interior of the vehicle in winter may be obtained.

As illustrated in FIG. 1, an exhaust heat recovery device in the related art generally has a structure in which a separate valve actuator 4 is provided outside a bypass passage 2, which is opened and closed through a bypass valve 1, and outside a heat exchanger 3 so as to rotate the bypass valve 1.

However, in the case of the exhaust heat recovery device with an externally-carried valve actuator in the related art, in which the valve actuator is disposed outside the heat exchanger, there are problems in that a structure thereof is complicated, and a space for placing other components is relatively decreased because the valve actuator is mounted outside the heat exchanger, and a space occupied by the exhaust heat recovery device is increased.

Even in the case of an exhaust heat recovery device with an embedded valve actuator in which a valve actuator is inserted into a heat exchanger in order to solve the aforementioned problems, a structure for rotating a bypass valve using the valve actuator is complicated, and as a result, there still remain problems in that production costs and weight are increased, and manufacturing processes are complicated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an operating structure of an exhaust heat recovery device with an embedded valve actuator, which reduces an overall size of the exhaust heat recovery device, simplifies the operating structure of the exhaust heat recovery device, and reduces production costs and weight by inserting a valve actuator into a heat exchanger.

Technical problems to be achieved in the present invention are not limited to the aforementioned technical problems, and any other not-mentioned technical problems will be obviously understood from the description below by those skilled in the technical field to which the present invention pertains.

In an aspect of the present invention, an operating structure of an exhaust heat recovery device with an embedded valve actuator, may include a bypass valve which is installed in a bypass passage, through which high-temperature exhaust gas passes, to be rotatable about a rotation shaft to open and close the bypass passage, a heat exchanger which communicates with the bypass passage, is coupled to a side portion of the bypass passage, and exchanges heat between the high-temperature exhaust gas and a low-temperature coolant when the bypass passage is closed, the valve actuator which is inserted into the heat exchanger, and may have a piston that is moved upward and downward as wax sealed in the valve actuator is expanded or contracted depending on a temperature of the coolant, a guide unit which may have a first side at which an end of the piston is slidably inserted, and a second side at which a first end of a rod is slidably inserted, a displacement transmission medium which is accommodated in the guide unit, and moved along with upward and downward movement of the piston, a link unit which is rotatably connected to a rotation shaft of the bypass valve and the rod, and converts sliding motion of the rod into rotational motion of the rotation shaft of the bypass valve, and an elastic restoring unit which applies elastic restoring force to the rod or the rotation shaft of the bypass valve, and operates the rod so that the rod is inserted into the guide unit, or operates the bypass valve so that the bypass valve is closed.

The displacement transmission medium is a plurality of spherical balls that is independently accommodated in the guide unit.

The displacement transmission medium is a plurality of annular rollers that is independently accommodated in the guide unit.

The rod is formed to be relatively longer than a maximum displacement of the upward and downward movement of the piston provided in the valve actuator.

The link unit may include a first connecting portion which is coupled to a side portion of the rod, is moved depending on the movement of the rod, and may have a hollow slot, and a second connecting portion which may have a first end that is coupled to the rotation shaft of the bypass valve, and a second end that is slidably accommodated in the slot of the first connecting portion.

The elastic restoring unit may include a first housing which is coupled to the second side of the guide unit, and accommodates the rod and the rotation shaft of the bypass valve therein, and a first compressive spring which is disposed between a second end of the rod and an inner surface of the first housing, and applies elastic restoring force to the rod.

The elastic restoring unit may include a second housing which is coupled to the second side of the guide unit, and accommodates the rod so that the rod protrudes through a hollow portion that is formed at a side of the second housing, a rod extension portion which is vertically extended outward from an outer surface of the rod, and a second compressive spring which is disposed between the rod extension portion and an inner surface of the second housing, and applies elastic restoring force to the rod.

The elastic restoring unit is a torsion spring which is coupled to an outer circumferential surface of the rotation shaft of the bypass valve, and applies twisting moment so that the rotation shaft of the bypass valve is rotated.

When the temperature of the coolant, which passes through the heat exchanger in a low load state of a vehicle, is relatively lower than an expansion temperature of the wax in the valve actuator, the high-temperature exhaust gas flows in a direction toward the heat exchanger as a state in which the bypass valve closes the bypass passage is maintained by tensile force of the elastic restoring unit.

When the temperature of the coolant, which passes through the heat exchanger, is relatively higher than an expansion temperature of the wax in the valve actuator, as the wax is expanded, the piston of the valve actuator is moved upward to move the displacement transmission medium, the rod protrudes by the displacement transmission medium while overcoming tensile force of the elastic restoring unit, and the bypass valve is rotated through the link unit to open the bypass passage.

When the temperature of the coolant, which passes through the heat exchanger in a high load state of a vehicle, is relatively lower than an expansion temperature of the wax in the valve actuator, pressure of exhaust gas, which passes through the bypass passage, becomes relatively higher than tensile force of the elastic restoring unit, and the bypass valve is independently rotated regardless of the valve actuator and the displacement transmission medium, and opens the bypass passage.

The present invention having the aforementioned configuration has effects in that a peripheral space of the exhaust heat recovery device becomes large by inserting the valve actuator having the wax sealed therein into the heat exchanger so as to reduce an overall size of the exhaust heat recovery device, and as a result, a degree of freedom of a package configuration of the exhaust heat recovery device is increased.

The rotation shaft of the bypass valve and the valve actuator are connected by the displacement transmission medium and the link unit which are comparatively simply configured, thereby simplifying an assembly process of the exhaust heat recovery device, reducing the number of assembly processes and time required to perform assembly processes, and reducing production costs and weight.

The rod is configured to be operated independently of the displacement transmission medium, such that in a high load state of the vehicle due to temporary sudden acceleration of the vehicle or the like, the rotation shaft of the bypass valve and the rod may be moved by pressure of exhaust gas, and the bypass valve may open the bypass passage, thereby ensuring output of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
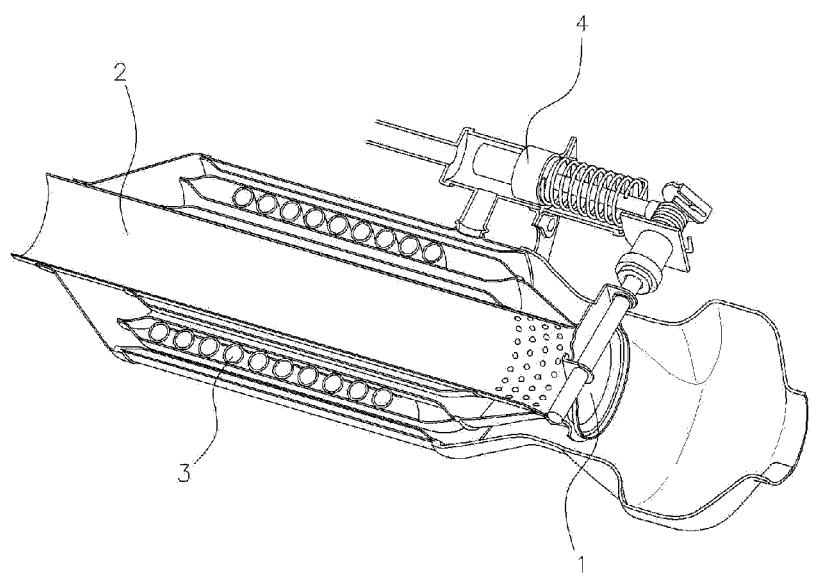
FIG. 1 is a partially cut-out perspective view illustrating an appearance of an exhaust heat recovery device in the related art in which a valve actuator is disposed outside a heat exchanger.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the present invention will be described in detail with reference to the accompanying drawings so that those skilled in the technical field to which the present invention pertains may easily carry out the present invention. However, the present invention may be implemented in various different forms, and is not limited to the exemplary embodiments described herein.

A part irrelevant to the description will be omitted to clearly describe the present invention, and the same or similar constituent elements will be designated by the same reference numerals throughout the specification.

Terms or words used in the specification and the claims should not be interpreted as a general and dictionary meaning and should be interpreted as a meaning and a concept which conform to the technical spirit of the present invention based on a principle that an inventor can appropriately define a concept of a term in order to describe his/her own invention by the best method.

Figure 2:
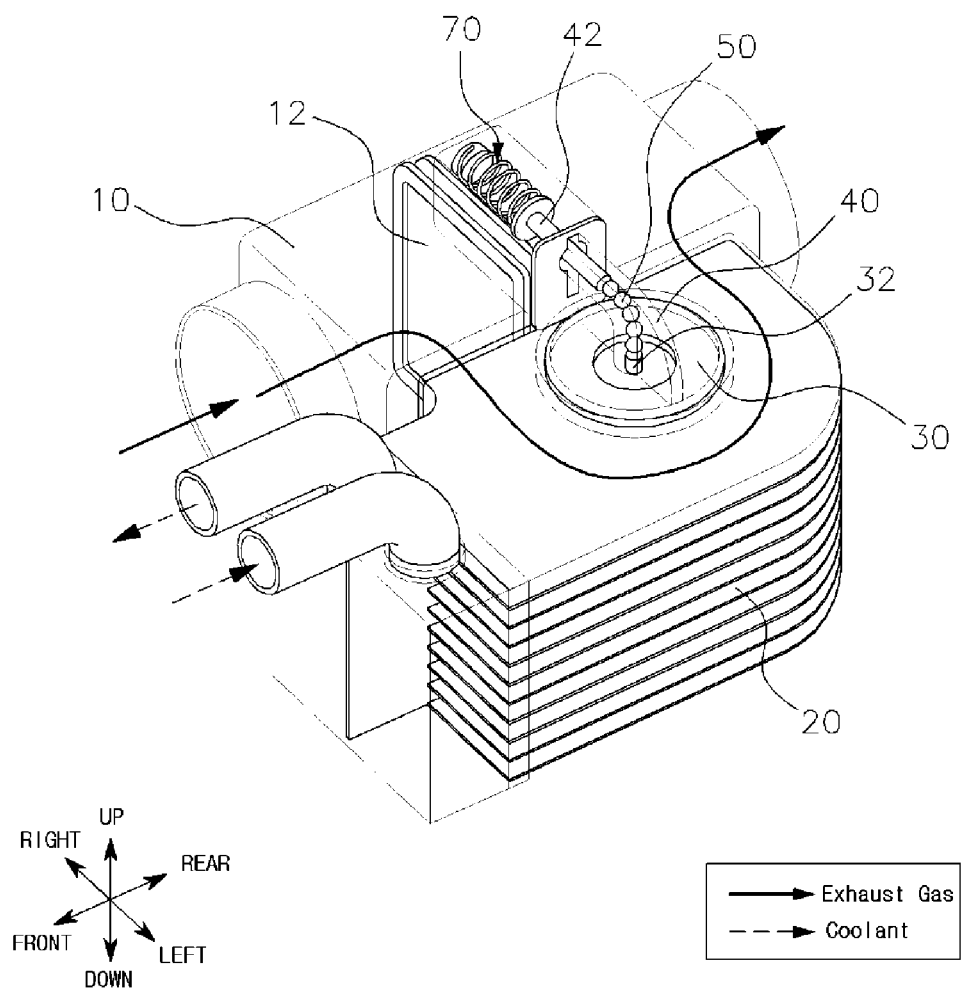
FIG. 2 is a projection perspective view illustrating an overall appearance of an exhaust heat recovery device with an embedded valve actuator according to an exemplary embodiment of the present invention.

FIG. 2 is a projection perspective view illustrating an overall appearance of an exhaust heat recovery device with an embedded valve actuator 30 according to an exemplary embodiment of the present invention.

As illustrated in FIG. 2, a bypass passage 10 is formed in a pipe shape so that high-temperature exhaust gas may pass through the interior of the bypass passage 10, and a bypass valve 12 is openably and closably installed in the bypass passage 10.

The bypass valve 12 is disposed to cross the bypass passage 10, and closes the bypass passage 10, or the bypass valve 12 is operated in a manner in which the bypass valve 12 opens the bypass passage 10 while being rotated in a clockwise direction in the illustrated exemplary embodiment.

Specifically, in the illustrated exemplary embodiment, an inlet of the bypass passage 10 into which the exhaust gas flows and an outlet of the bypass passage 10 from which the exhaust gas is discharged are formed in a circular pipe shape, an intermediate portion between the inlet and the outlet is formed in a quadrangular pipe shape, and the bypass valve 12 is formed in a quadrangular plate shape so as to correspond to the shape of the bypass passage 10.

The bypass passage 10 may be formed in various shapes such as a hexagonal pipe shape, or an elliptical pipe shape in consideration of the type of vehicle, an amount of exhaust gas being discharged, an overall external appearance of a vehicle body and the like, and the bypass valve 12 may also be formed in various shapes so as to correspond to the shape of the bypass passage 10.

As illustrated in FIG. 2, a heat exchanger 20 which exchanges heat between the high-temperature exhaust gas, which is supplied from the bypass passage 10 when the bypass passage 10 is closed, and a low-temperature coolant, which flows into a coolant inlet and is discharged from a coolant outlet, is attached to a side portion of the bypass passage 10.

The high-temperature exhaust gas and the low-temperature coolant, which pass through the interior of the heat exchanger 20, flow in the opposite directions in the heat exchanger 20, and the coolant, which is heated in the flow process, is discharged from the coolant outlet and serves to warm up a transmission or an engine.

In the illustrated exemplary embodiment, the heat exchanger 20 is formed as a stacked type heat exchanger in which a coolant passage and an exhaust gas passage are alternately stacked, and the exhaust gas passage communicates with the bypass passage 10.

As illustrated in FIG. 2, a valve actuator 30, which has wax sealed in the interior thereof and moves a piston (32 in FIG. 7) upward and downward, is penetratively inserted into the heat exchanger 20 in an upward and downward direction.

The valve actuator 30 is operated in a manner in which the valve actuator 30 moves the piston 32 upward when an expansion temperature of the sealed wax is higher than a temperature of the coolant in the heat exchanger 20, and moves the piston 32 downward when the expansion temperature of the sealed wax is lower than the temperature of the coolant in the heat exchanger 20.

As illustrated in FIG. 2, a guide unit 40, which has one side at which an end of the piston (32 in FIG. 7) is slidably inserted, and the other side at which one end of a rod 42 is slidably inserted, is installed on an upper portion of the valve actuator 30, that is, an upper portion of the heat exchanger 20.

The guide unit 40 accommodates a displacement transmission medium 50 therein, and serves to guide the piston 32, the displacement transmission medium 50, and the rod 42 so that the rod 42 may be moved in a left and right direction when the piston 32 of the valve actuator 30 is moved upward and downward.

The guide unit 40 is disposed on the upper portion of the heat exchanger 20 in a left and right direction, and a guide groove, which is curved in a '⌐' shape, is formed in the guide unit 40 so as to accommodate the displacement transmission medium 50.

The displacement transmission medium 50 accommodated in the guide unit 40 is a constituent element that serves to transmit the movement of the piston 32 to the rod 42, and may be a plurality of spherical balls or a plurality of annular rollers which is independently configured.

The displacement transmission medium 50 may sufficiently transmit the displacement of the piston 32 to the rod 42 so as to open and close the bypass valve 12 even though the displacement transmission medium 50 is not formed as a plurality of spherical balls or a plurality of annular rollers.

That is, the displacement transmission medium 50 may sufficiently transmit the displacement of the piston 32 even though the displacement transmission medium 50 is formed as high density oil, a cable, or the like, but in this case, as will be described below, the rod 42 and a rotation shaft 14 of the bypass valve may not be moved independently of the displacement transmission medium 50 in a high load state of the vehicle such as temporary sudden acceleration of the vehicle, and as a result, the bypass valve 12 closes the bypass passage 10, and output of the engine may not be ensured.

The high density oil or the like may cause an operational error during a process of transmitting the movement of the piston 32 to the rod 42, and may cause an operational defect while being affected by a peripheral environment (temperature and the like).

Therefore, the displacement transmission medium 50 may be formed as a rigid body, and may selectively come into contact with the rod 42 so that the rod 42 and the rotation shaft 14 of the bypass valve may be independently moved.

As illustrated in FIG. 2, one end of the rod 42 is slidably inserted into the guide unit 40, and a length of the rod 42 may be relatively longer than a maximum upward and downward displacement of the piston 32.

The purpose of this configuration is to prevent the rod 42 from being moved away from the guide unit 40 even when the piston 32 of the valve actuator 30 is maximally moved upward, and the rod 42 maximally protrudes.

Figure 3:
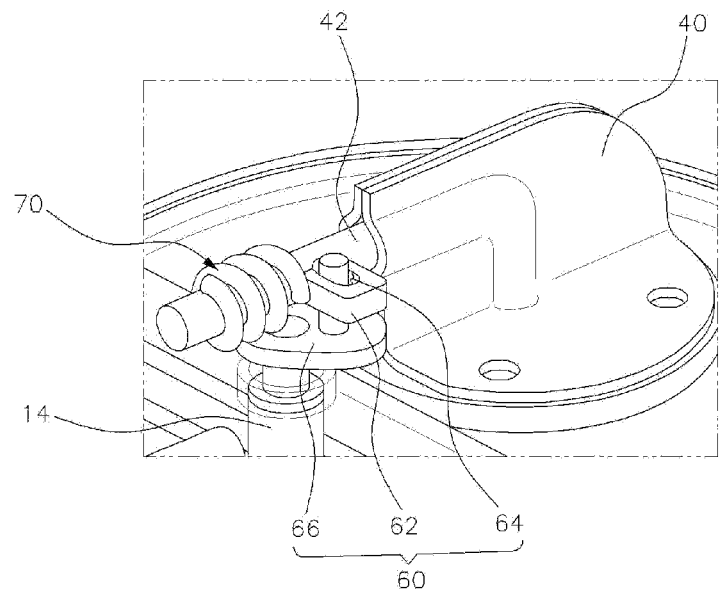
FIG. 3 is an enlarged perspective view illustrating an appearance of a link unit according to the exemplary embodiment of the present invention.
Figure 4A:
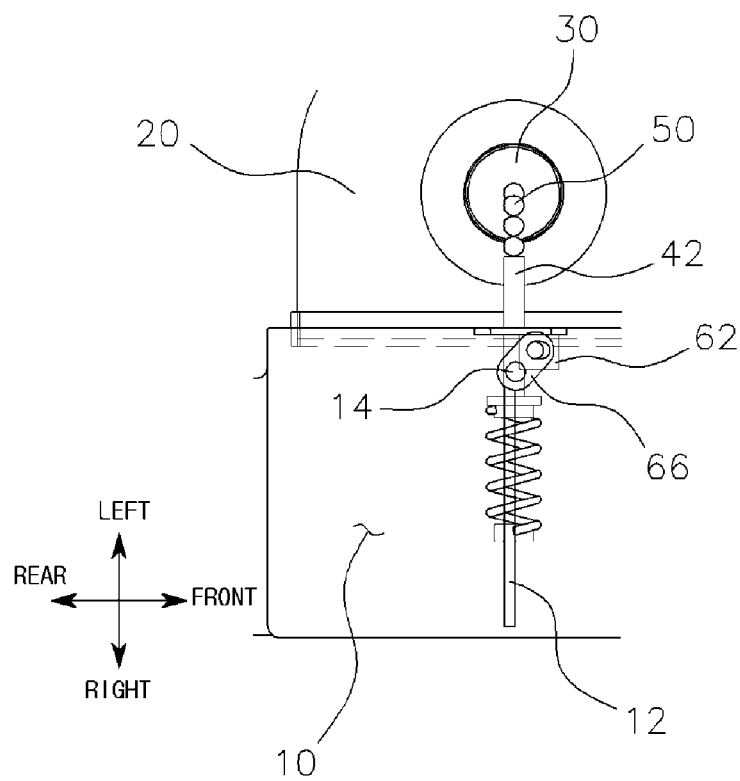
FIG. 4A is a projection plan view illustrating an operational state of the link unit when a bypass passage according to the exemplary embodiment of the present invention is closed.
Figure 4B:
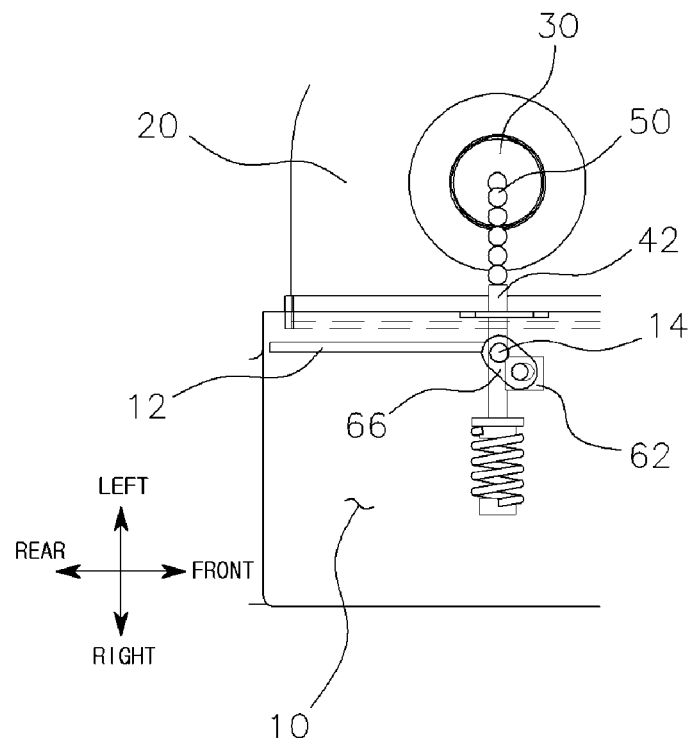
FIG. 4B is a projection plan view illustrating an operational state of the link unit when the bypass passage according to the exemplary embodiment of the present invention is opened.

FIG. 3 is an enlarged perspective view illustrating an appearance of a link unit 60 according to the exemplary embodiment of the present invention, FIG. 4A is a projection plan view illustrating an operational state of the link unit 60 when the bypass passage 10 according to the exemplary embodiment of the present invention is closed, and FIG. 4B is a projection plan view illustrating an operational state of the link unit 60 when the bypass passage 10 according to the exemplary embodiment of the present invention is opened.

As illustrated in FIG. 3, the link unit 60, which converts left and right sliding motion of the rod 42 into rotational motion of the bypass valve 12, is connected between the rotation shaft 14 of the bypass valve and the rod 42.

The link unit 60 may be formed in various forms such as a cam which converts circular motion into reciprocating motion or oscillating motion, or converts reciprocating motion or oscillating motion into circular motion, mechanical elements which use a pinion gear and a rack gear, a link structure which converts reciprocating motion into rotational motion using a plurality of links, or the like.

The link unit 60 according to the exemplary embodiment of the present invention includes: a first connecting portion 62 which is coupled to a side portion of the rod 42, is moved along with the movement of the rod 42, and has a hollow slot 64, and a second connecting portion 66 which has one end that is coupled to the rotation shaft 14 of the bypass valve, and the other end that is slidably accommodated in the slot 64 of the first connecting portion 62.

As illustrated in FIG. 4A, when the bypass valve 12 closes the bypass passage 10, the first connecting portion 62 is disposed to be adjacent to the heat exchanger 20 along the rod 42, and the bypass valve 12 forms a rectilinear line with the rod 42.

As illustrated in FIG. 4B, when the rod 42 protrudes in a direction toward the bypass passage 10 as a temperature of the coolant in the heat exchanger 20 is raised, the first connecting portion 62 is also moved in a direction toward the bypass passage 10 along the rod 42, and as a result, the second connecting portion 66 rotates the rotation shaft 14 in a clockwise direction while being rotated in the clockwise direction in the illustrated exemplary embodiment.

Therefore, the bypass valve 12 opens the bypass passage 10 while being rotated in the clockwise direction, and almost the whole high-temperature exhaust gas is discharged to the outside of the vehicle through the bypass passage 10.

The left and right direction, the upward and downward direction, the clockwise direction, and the like, which have been used above, are arbitrarily designated for convenience of description, and those skilled in the art may understand that the disposition direction, which has been used above, may be changed depending on disposition of the exhaust heat recovery device, a position of the bypass passage 10 on which the heat exchanger 20 is placed, and the like.

Figure 5A:
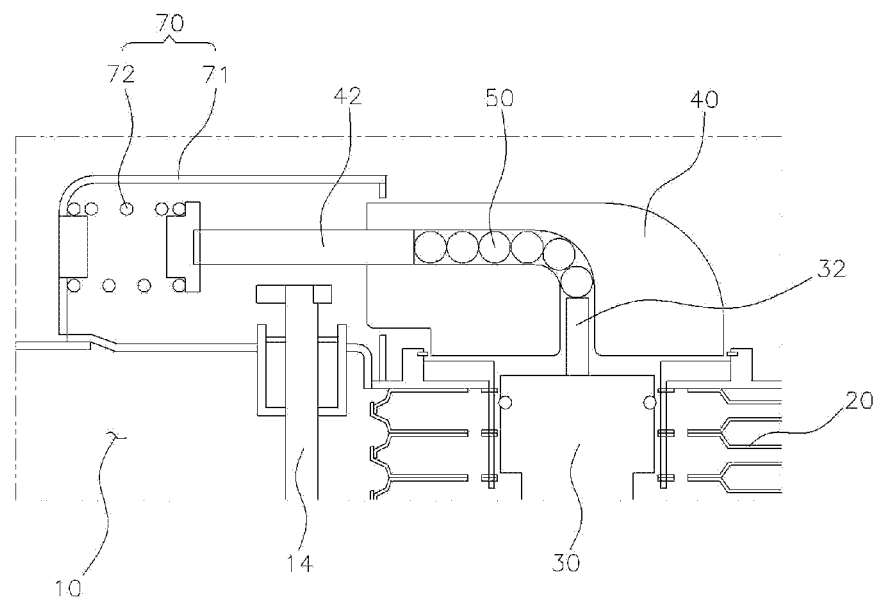
FIG. 5A is a partial cross-sectional view illustrating an appearance of an elastic restoring unit in an operating structure of the exhaust heat recovery device with an embedded valve actuator according to the exemplary embodiment of the present invention.
Figure 5B:
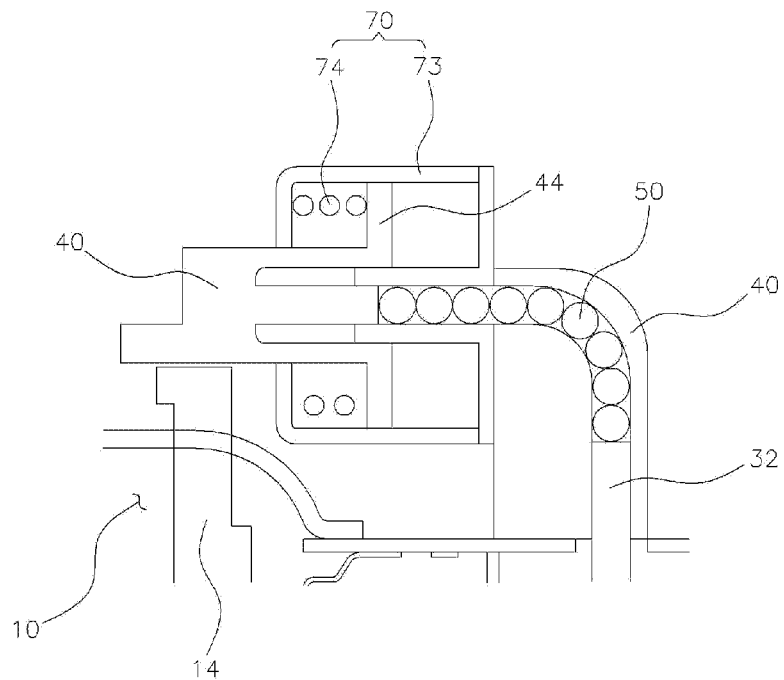
FIG. 5B is a partial cross-sectional view illustrating an appearance of an elastic restoring unit in an operating structure of an exhaust heat recovery device with an embedded valve actuator according to another exemplary embodiment of the present invention.
Figure 5C:
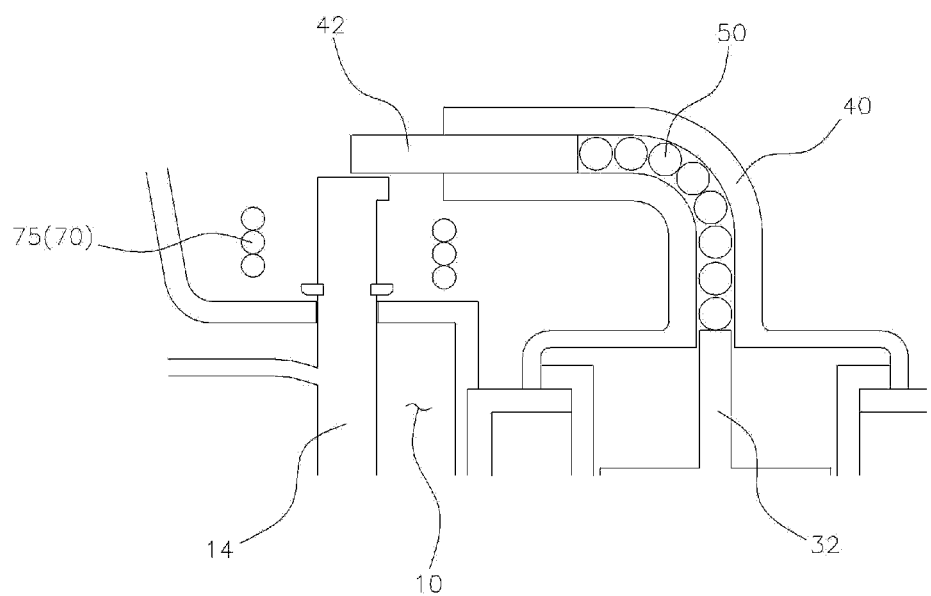
FIG. 5C is a partial cross-sectional view illustrating an appearance of an elastic restoring unit in an operating structure of an exhaust heat recovery device with an embedded valve actuator according to yet another exemplary embodiment of the present invention.

FIG. 5A is a partial cross-sectional view illustrating an appearance of an elastic restoring unit 70 in an operating structure of the exhaust heat recovery device with the embedded valve actuator 30 according to the exemplary embodiment of the present invention, FIG. 5B is a partial cross-sectional view illustrating an appearance of an elastic restoring unit 70 in an operating structure of an exhaust heat recovery device with an embedded valve actuator 30 according to another exemplary embodiment of the present invention, and FIG. 5C is a partial cross-sectional view illustrating an appearance of an elastic restoring unit 70 in an operating structure of an exhaust heat recovery device with an embedded valve actuator 30 according to yet another exemplary embodiment of the present invention.

As illustrated in FIGS. 5A to 5C, the elastic restoring unit 70 serves to apply elastic restoring force to the rod 42 or the rotation shaft 14 of the bypass valve 12, and move the rod 42 in a direction in which the rod 42 is inserted into the guide unit 40 or in a direction in which the bypass valve 12 closes the bypass passage 10.

Specifically, as illustrated in FIG. 5A, the elastic restoring unit 70 according to the exemplary embodiment of the present invention includes: a first housing 71 which is disposed over the upper portion of the bypass passage 10 from the other side of the guide unit 40, and has a shape in which the rod 42 is completely accommodated, and a first compressive spring 72 which is disposed between the end of the rod 42 and an inner surface of the first housing 71, and applies elastic restoring force to the rod 42.

As described above, when the piston 32 is moved upward as a temperature of the coolant in the heat exchanger 20 is raised, such that the displacement transmission medium 50 is moved to allow the rod 42 to protrude, the bypass valve 12 opens the bypass passage 10.

Thereafter, when the piston 32 is moved downward again, the first compressive spring 72, which is disposed between the first housing 71 and the rod 42, applies tensile force to the rod 42, and as a result, the rod 42 is inserted into the guide unit 40 such that the bypass valve 12 is rotated to close the bypass passage 10.

As illustrated in FIG. 5B, the elastic restoring unit 70 according to another exemplary embodiment of the present invention includes: a second housing 73 which is coupled to the other side of the guide unit 40 and accommodates the rod 42 so that the rod 42 may protrude through a hollow portion that is formed at a side of the second housing 73, a rod extension portion 44 which is vertically extended outwardly from an outer surface of the rod 42, and a second compressive spring 74 which is disposed between the rod extension portion 44 and an inner surface of the second housing 73 and applies elastic restoring force to the rod 42.

That is, an operation principle of the elastic restoring unit 70 illustrated in FIG. 5B is similar to that of the elastic restoring unit 70 illustrated in FIG. 5A, but the elastic restoring unit 70 illustrated in FIG. 5B differs from the elastic restoring unit 70 illustrated in FIG. 5A in that the rotation shaft 14 of the bypass valve is disposed outside the second housing 73, the rod 42, which is disposed in the second housing 73, is also formed to be moved in and out through the hollow portion, and the second compressive spring 74 is disposed between the inner surface of the second housing 73 and the rod extension portion 44.

The elastic restoring unit 70 illustrated in FIG. 5B has an advantage in that the rod 42 may be completely prevented from being pulled out to the outside of the guide unit 40, but has a disadvantage in that the elastic restoring unit 70 illustrated in FIG. 5B has lower formability than the elastic restoring unit 70 illustrated in FIG. 5A because the rod extension portion 44 needs to be formed on the side portion of the rod 42.

As illustrated in FIG. 5C, the elastic restoring unit 70 according to yet another exemplary embodiment of the present invention is formed as a torsion spring 75 which is coupled to an outer circumferential surface of the rotation shaft 14 of the bypass passage 10 and applies twisting moment so that the rotation shaft 14 of the bypass passage 10 may be rotated.

The elastic restoring unit 70 illustrated in FIG. 5C differs from the elastic restoring units 70 illustrated in FIGS. 5A and 5B in that elastic restoring force is directly applied to the rotation shaft 14 of the bypass valve 12.

That is, the elastic restoring unit 70 illustrated in FIG. 5C rotates the rotation shaft 14 of the bypass valve so that the bypass valve 12 may close the bypass passage 10, and the rod 42 is inserted into the guide unit 40 depending on the rotation of the rotation shaft 14 of the bypass valve.

An operational process of the operating structure of the exhaust heat recovery device with the embedded valve actuator 30 according to the exemplary embodiment of the present invention will be described below.

Figure 6:
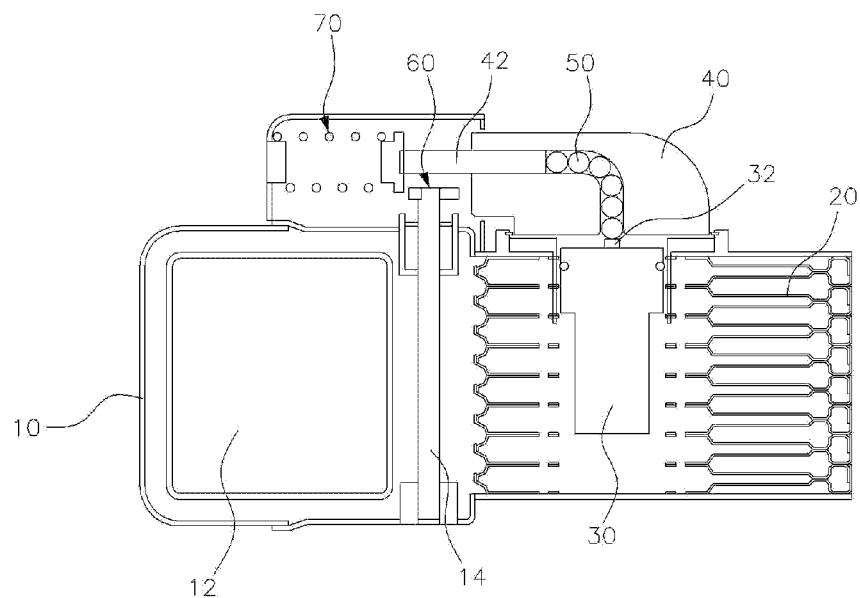
FIG. 6 is a cross-sectional view taken along line A-A' of FIG. 2, which illustrates an operational state when a coolant does not warm up in a low load state of a vehicle in the exhaust heat recovery device with an embedded valve actuator according to the exemplary embodiment of the present invention.

FIG. 6 is a cross-sectional view taken along line A-A' of FIG. 2, which illustrates an operational state when the coolant does not warm up in a low load state of the vehicle in the exhaust heat recovery device with the embedded valve actuator 30 according to the exemplary embodiment of the present invention.

As illustrated in FIG. 6, when a temperature of the coolant, which passes through the heat exchanger 20 in a low load state of the vehicle, is relatively lower than an expansion temperature of the wax in the valve actuator 30, that is, when the coolant does not warm up, a state in which the rod 42 is inserted into the guide unit 40 is maintained by tensile force of the elastic restoring unit 70.

As the state in which the rod 42 is inserted into the guide unit 40 is maintained, a state in which the bypass valve 12 closes the bypass passage 10 is maintained, and high-temperature exhaust gas flows in a direction toward the heat exchanger 20, and exchanges heat with a low-temperature coolant.

Figure 7:
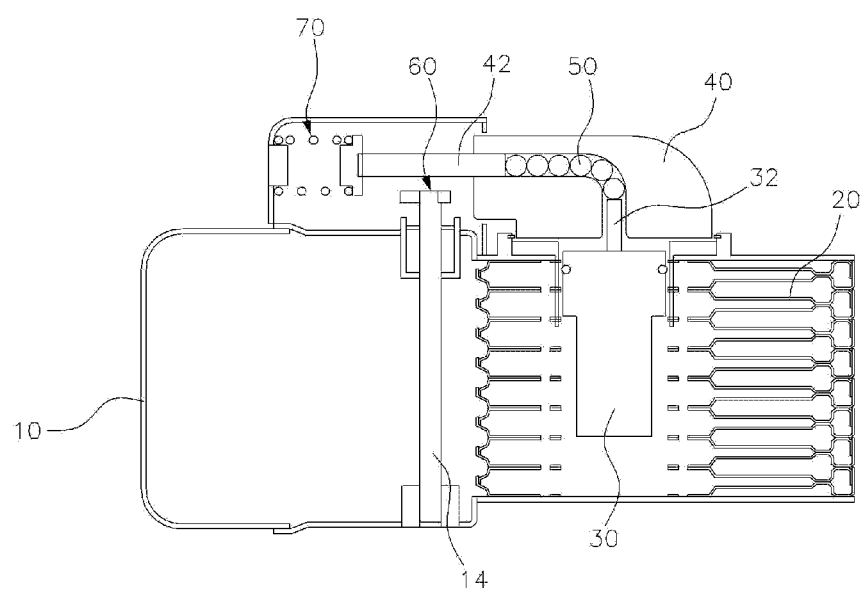
FIG. 7 is a cross-sectional view taken along line A-A' of FIG. 2, which illustrates an operational state when the coolant warms up in the exhaust heat recovery device with an embedded valve actuator according to the exemplary embodiment of the present invention.

FIG. 7 is a cross-sectional view taken along line A-A' of FIG. 2, which illustrates an operational state when the coolant warms up in the exhaust heat recovery device with the embedded valve actuator 30 according to the exemplary embodiment of the present invention.

As illustrated in FIG. 7, as the wax in the valve actuator 30 is expanded when a temperature of the coolant, which passes through the heat exchanger 20, is relatively higher than an expansion temperature of the wax in the valve actuator 30, that is, when the coolant warmed up, the piston 32 is moved upward.

As the piston 32 is moved upward, the displacement transmission medium 50 and the rod 42 are moved while overcoming tensile force of the elastic restoring unit 70, and as the rod 42 is moved, the bypass valve 12 is rotated through the link unit 60.

As the bypass valve 12 is rotated, the bypass passage 10 is opened, and as a result, most of the exhaust gas bypasses the heat exchanger 20 through the bypass passage 10, and the heat exchange through the heat exchanger 20 is blocked.

Figure 8:
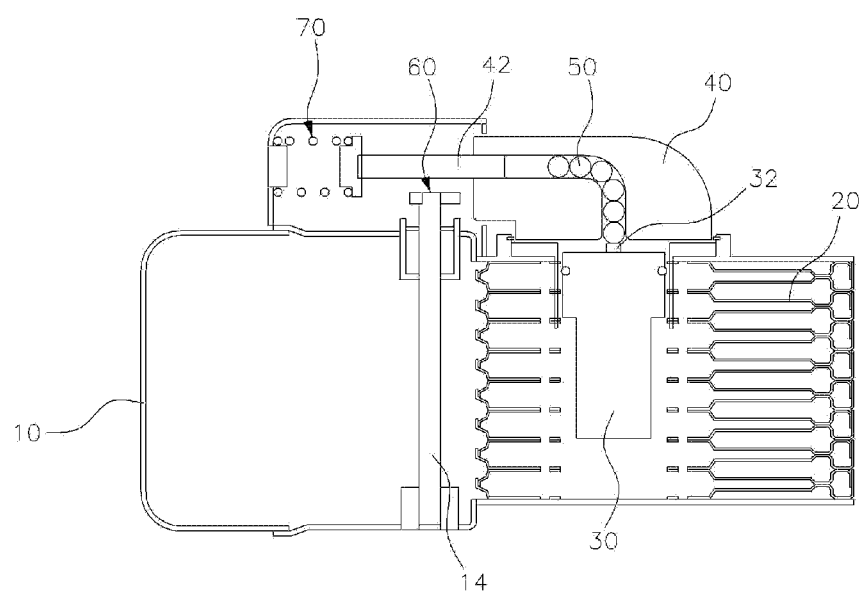
FIG. 8 is a cross-sectional view taken along line A-A' of FIG. 2, which illustrates an operational state when the coolant does not warm up in a high load state of a vehicle in the exhaust heat recovery device with an embedded valve actuator according to the exemplary embodiment of the present invention.

FIG. 8 is a cross-sectional view taken along line A-A' of FIG. 2, which illustrates an operational state when the coolant does not warm up in a high load state of the vehicle in the exhaust heat recovery device with the embedded valve actuator 30 according to the exemplary embodiment of the present invention.

As illustrated in FIG. 8, in a high load traveling state due to temporary sudden acceleration of the vehicle or the like, when a temperature of the coolant, which passes through the heat exchanger 20, is relatively lower than an expansion temperature of the wax in the valve actuator 30, that is, before the coolant warms up, the rod 42 and the bypass valve 12 need to be moved independently of the valve actuator 30 and the displacement transmission medium 50.

That is, in this case, pressure of exhaust gas, which passes through the bypass passage 10, becomes relatively higher than tensile force of the elastic restoring unit 70, and as a result, the bypass valve 12 is independently rotated regardless of the valve actuator 30 and the displacement transmission medium 50, and opens the bypass passage 10.

The bypass valve 12 is independently opened by pressure of exhaust gas, such that overall back pressure in the exhaust heat recovery device may be reduced, thereby ensuring output of the engine of the vehicle.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An operating structure of an exhaust heat recovery device with an embedded valve actuator, comprising: a bypass valve which is installed in a bypass passage, through which high-temperature exhaust gas passes, to be rotatable about a rotation shaft to open and close the bypass passage; a heat exchanger which communicates with the bypass passage, is coupled to a side portion of the bypass passage, and exchanges heat between the high-temperature exhaust gas and a low-temperature coolant when the bypass passage is closed; the valve actuator which is inserted into the heat exchanger, and has a piston that is moved upward and downward as wax sealed in the valve actuator is expanded or contracted depending on a temperature of the coolant; a guide unit which has a first side at which an end of the piston is slidably inserted, and a second side at which a first end of a rod is slidably inserted; a displacement transmission medium which is accommodated in the guide unit, and moved along with upward and downward movement of the piston; a link unit which is rotatably connected to a rotation shaft of the bypass valve and the rod, and converts sliding motion of the rod into rotational motion of the rotation shaft of the bypass valve; and an elastic restoring unit which applies elastic restoring force to the rod or the rotation shaft of the bypass valve, and operates the rod so that the rod is inserted into the guide unit, or operates the bypass valve so that the bypass valve is closed, wherein the displacement transmission medium is a plurality of spherical balls that is independently accommodated in the guide unit.

2. The operating structure of claim 1, wherein the displacement transmission medium is a plurality of annular rollers that is independently accommodated in the guide unit.

3. The operating structure of claim 1, wherein the rod is formed to be relatively longer than a maximum displacement of the upward and downward movement of the piston provided in the valve actuator.

4. The operating structure of claim 1, wherein the link unit includes:
   a first connecting portion which is coupled to a side portion of the rod, is moved depending on the movement of the rod, and has a hollow slot; and
   a second connecting portion which has a first end that is coupled to the rotation shaft of the bypass valve, and a second end that is slidably accommodated in the slot of the first connecting portion.

5. The operating structure of claim 1, wherein the elastic restoring unit includes:
   a first housing which is coupled to the second side of the guide unit, and accommodates the rod and the rotation shaft of the bypass valve therein; and
   a first compressive spring which is disposed between a second end of the rod and an inner surface of the first housing, and applies elastic restoring force to the rod.

6. The operating structure of claim 1, wherein the elastic restoring unit includes:
   a second housing which is coupled to the second side of the guide unit, and accommodates the rod so that the rod protrudes through a hollow portion that is formed at a side of the second housing;
   a rod extension portion which is vertically extended outward from an outer surface of the rod; and
   a second compressive spring which is disposed between the rod extension portion and an inner surface of the second housing, and applies elastic restoring force to the rod.

7. The operating structure of claim 1, wherein the elastic restoring unit is a torsion spring which is coupled to an outer circumferential surface of the rotation shaft of the bypass valve, and applies twisting moment so that the rotation shaft of the bypass valve is rotated.

8. The operating structure of claim 1, wherein when the temperature of the coolant, which passes through the heat exchanger in a low load state of a vehicle, is relatively lower than an expansion temperature of the wax in the valve actuator, the high-temperature exhaust gas flows in a direction toward the heat exchanger as a state in which the bypass valve closes the bypass passage is maintained by tensile force of the elastic restoring unit.

9. The operating structure of claim 1, wherein when the temperature of the coolant, which passes through the heat exchanger, is relatively higher than an expansion temperature of the wax in the valve actuator, as the wax is expanded, the piston of the valve actuator is moved upward to move the displacement transmission medium, the rod protrudes by the displacement transmission medium while overcoming tensile force of the elastic restoring unit, and the bypass valve is rotated through the link unit to open the bypass passage.

10. The operating structure of claim 1, wherein when the temperature of the coolant, which passes through the heat exchanger in a high load state of a vehicle, is relatively lower than an expansion temperature of the wax in the valve actuator, pressure of exhaust gas, which passes through the bypass passage, becomes relatively higher than tensile force of the elastic restoring unit, and the bypass valve is independently rotated regardless of the valve actuator and the displacement transmission medium, and opens the bypass passage.

* * * * *